Aug. 5, 1930.   A. B. MERRILL   1,772,190
METHOD OF LINING TANKS
Filed July 23, 1926
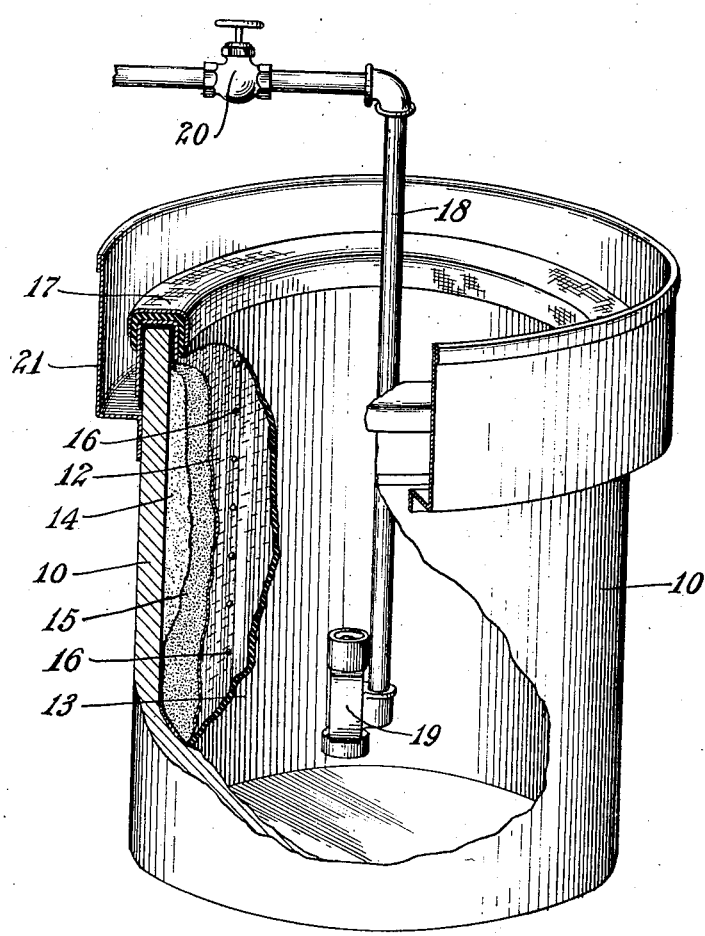
Inventor
Allan B. Merrill,
By Pierson, Erskin & Avery
Attys.

Patented Aug. 5, 1930

1,772,190

UNITED STATES PATENT OFFICE

ALLAN B. MERRILL, OF AKRON, OHIO, ASSIGNOR TO THE B. F. GOODRICH COMPANY, OF NEW YORK, N. Y., A CORPORATION OF NEW YORK

METHOD OF LINING TANKS

Application filed July 23, 1926. Serial No. 124,390.

This invention relates to the art of lining tanks and like receptacles and particularly to the application of acid-resisting linings to large-capacity receptacles employed in chemical manufacturing processes and for the storage of corrosive chemicals, and it has for its object to provide an improved procedure for installing a lining of the character indicated, and also to provide a tank equipped with an improved, durable lining which will resist the destructive action of acids and other liquids.

It has heretofore been the practice to line wooden tanks employed for the storage of hot acids with raw or uncured rubber. The rubber itself is not greatly affected by the acid, but the acid diffuses through it after a period of time and attacks the tank. Further, the raw rubber is subject to tearing when knocked by agitating devices requiring great care in handling such devices and immediate repair when damage results. Vulcanized rubber linings have also been heretofore proposed but no completely satisfactory method for applying such linings has heretofore been devised.

It is the purpose of the present invention to provide an improved method of installing a rubber lining in a tank, consisting of first fastening a substructure to the tank and then vulcanizing sheet rubber to the substructure by the aid of a heated liquid filling the tank. By this method, I am enabled to provide a vulcanized rubber lining which shall be both highly resistant and impermeable to acid, tough and strong to resist the knocks to which such linings are commonly subjected and further to provide a lining which can be quickly and firmly attached to the walls of the receptacle.

Of the accompanying drawing, the figure represents a cylindrical tank or vat lined with sheet rubber in accordance with the present invention, parts being broken away and in section to show the details of the lining construction.

Referring to the drawing for a more detailed description of my invention, I show at 10 a tank constructed of wood, metal or other suitable material and provided with a lining which covers the entire inner surface of the tank and extends over the rim and onto its outer surface for a short distance. The extension of the lining onto the outer side of the tank may be omitted, if desired, but in large vats used in the industries such extension of the lining is desirable since it protects the upper edge of the tank against accidental spilling of the liquid contents during filling or emptying of the tank and further serves as a more secure anchorage for the upper edge of the lining.

The lining shown is a laminated structure consisting of a fabric backing 12, impregnated with a curable rubber compound, as by frictioning, dipping, or spreading, and a vulcanized rubber facing 13, integrally coalesced to the backing 12 during vulcanization as is more fully hereinafter described. The fabric backing 12 is preferably made of asbestos for the reason that asbestos is resistant to acid and alkali and hence is not destroyed by an accidental breaking of the rubber facing and the consequent exposure to the corrosive contents of the tank. A cotton duck or canvas impregnated or coated with a curable rubber compound may also be satisfactorily employed in many situations, the rubber coating serving in a measure to protect the cotton fiber of the fabric.

It is essential that the fabric backing 12 be securely bonded to the tank at all points so as to conform closely to the inner surface thereof, and further the attachment must have sufficient strength to sustain the weight of the rubber lining which in large tanks is considerable. I have found that an adequate bond of the fabric backing to the tank may be obtained by the use of suitable cements, and that the factor of safety in the bond is greatly increased, when wooden tanks are being lined, by nailing the backing to the tank, although the latter is not essential. Thus I have shown in the drawing two binding films or layers, a heat-plastic film 14 applied directly to the tank and a curable rubber cement coating 15 covering the film 14, and mechanical fastening means 16, such as nails, screws or rivets, at the overlap of the sections of the backing 12, and also at points intermediate of the seams, if desired. A rubberized-fabric finishing strip 17 embraces the upper edge of the tank over the lining 13, and acts as a buffer to prevent injury to the lining 13 from contact with the cover (not shown) or from accidental knocks occasioned by the installation of agitating and heating devices.

While I have found that heat-plastic rubber derivatives, when applied as cements, adhere to metals and woods much more firmly than do rubber cements, it is to be understood that the heat-plastic film 14 may be omitted and rubber cement applied directly to the surface of the tank, particularly where the mechanical fastening means 16 are employed for attaching the backing fabric 12 to the tank. Where the heat-plastic film is employed, I prefer the balata-like rubber isomer described in the copending application of H. L. Fisher, Serial No. 758,099, filed December 16, 1924, and particularly the product prepared by mixing into rubber a sulfonic acid and heating the mix to cause a vigorous exothermal reaction. For example 7½ parts of p-phenol sulfonic acid to 100 parts of rubber produce a satisfactory heat-plastic rubber derivative. Other heat-plastic rubber derivatives may be employed and I do not desire wholly to limit this invention to the use of the specific heat-plastic hereinabove mentioned, or, indeed, to the use of a heat-plastic bonding layer in this construction hereinabove described.

In practice, I find that the following procedure for installing the above described lining has proved to be especially practical and commercially satisfactory and it is hereby given for purpose of illustration, it being understood that obvious variations from the procedure recited are intended to be included within the scope of this invention.

The interior surface of the tank is thoroughly cleansed, and if rough or uneven is made comparatively smooth. Upon the smooth and cleansed surface, one or more coatings of a cement formed by the solution of a heat-plastic rubber derivative in an organic solvent are applied, followed by one or more coatings of a rubber cement curable at a temperature somewhat less than that of boiling water, each coating being allowed to dry before the application of a succeeding coating. The fabric backing 12, being coated with a curable rubber compound and more or less tacky is smoothly rolled onto the cemented surface, care being taken to secure adhesion at all points between the backing and the cemented surfaces of the tank and not to entrap pockets of air. The edges of the fabric are preferably overlapped, and further secured by nails, screws or rivets passing through the overlapping edges into the wall of the tank.

The sheet-rubber facing 13 is now applied in an uncured condition. Sufficient tack is possessed both by the uncured rubber-coated fabric backing 12 and the facing 13 to cause the two to stick one to the other as the facing is placed on the backing. Precautions must be taken to secure a smooth overlaying of the facing and an adhesion to the backing at all points without the entrapping of air. If the backing and facing have been turned over the top of the tank, as shown in the figure, the finishing strip 17 of rubberized fabric is installed by first applying one edge portion to the inner surface of the lining and then turning the strip over the edge and down the outer side in such manner as to secure a smooth fit over the top edge of the tank.

The lining is now ready to be vulcanized in place, a process which is accomplished by filling the tank with a liquid and maintaining the liquid at a suitable temperature for the required time. Assuming that water is to be employed as the vulcanizing liquid, and that the rubber cement 15, the rubber of the coating of the backing 13 and of the facing 14 are all compounded to cure at a temperature somewhat lower than the boiling point of water, say 90° C., the tank is filled with water to overflowing, a steam pipe 18 having a noiseless heater 19 at its end inserted into the tank and steam is admitted by the manipulation of the control valve 20. The steam escaping from the heater 19 is condensed and the water heated to approximately its boiling temperature and maintained at that temperature until the cure is completed. The water overflowing the tank—the condensed heating steam adds continuously to the volume of water in the tank—may be relied upon to vulcanize the upper edges of the lining structure. Satisfactory linings have been obtained in this manner. In some instances, however, I prefer to construct a temporary extension 21 about the tank, which extension shall rise to a height of about 8 to 12 inches above the upper edge of the tank. By the use of this temporary weir, the rim and extension of the lining on the outside of the tank are continuously immersed and are subjected to a constant pressure-head and a constant temperature, conditions which favor a uniformly good vulcanization of the entire lining. Upon completion of the vulcanization, the weir 21 and pipe 18 are removed. The tank, emptied of water, is then ready for use.

While I have shown but one embodiment of my invention and have described the lining of large-capacity receptacles employed for holding corrosive chemicals, it is to be understood that numerous variations and modifications in the process of applying and in the construction of the lining may be made without departing from the principles of this invention and that the process and construction of lining of the present invention may be adapted to other types of receptacles. I therefore do not limit the claims herein wholly to the exact procedure described or to the specific construction shown.

I claim:

1. The process of lining a large tank or vat, such as is used in industrial operations, which consists in attaching a lining construction comprising curable rubber to the inner surfaces of the tank, securing to the upper portion of the outer wall of the tank a temporary extension adapted to hold a head of liquid above the upper rim of the tank, filling the tank and the extension with a liquid, and applying heat for the vulcanization of the rubber of the lining through the intermediary of said liquid.

2. The process of lining a tank which consists in attaching to the inner surface of the tank a lining comprising a rubber-coated fabric backing and a curable sheet rubber facing, providing the tank with a temporary extension adapted to hold a head of liquid above the upper rim of the tank, filling the tank and at least in part the extension with a liquid, and applying heat for the vulcanization of the rubber of the lining through the intermediary of said liquid.

3. The process of lining an industrial tank in its operative position in a factory which consists in cleaning the surfaces to be lined, applying thereto a solution of a heat-plastic derivative of rubber and permitting the solvent to evaporate, superposing thereon a coating of curable rubber cement, covering the cemented surface with a fabric coated with a curable rubber, covering the said fabric with a sheet of curable rubber, and consolidated and curing the several layers in place by means of a liquid filling the tank and serving as an intermediary for transference of heat thereto.

4. The process of lining an industrial tank in its operative position in a factory which consists in cleaning the surfaces to be lined, applying thereto a solution of a heat-plastic derivative of rubber and permitting the solvent to evaporate, superposing thereon a coating of curable rubber cement, covering the cemented surface with a fabric coated with a curable rubber, covering the said fabric with a sheet of curable rubber, securing to the tank a temporary extension adapted to hold a head of liquid above the upper rim of the tank, and consolidating and curing the several layers in place by means of a liquid filling the tank and the temporary extension and serving as an intermediary for transference of heat thereto.

5. The process of lining a large tank or vat without the necessity of removing it from its operative position which consists in covering inner surfaces and the upper edge of the tank and also a portion of its outer surface contiguous to the said upper edge with a continuous lining construction comprising curable rubber, securing to the outer walls of the tank below said lining construction thereon a temporary extension adapted to hold a positive head of liquid in contact with the entire lining construction, filling the tank and at least in part the extension with a liquid, and applying heat for the vulcanization of the rubber of the lining through the intermediary of said liquid.

In witness whereof I have hereunto set my hand this 13th day of July, 1926.

ALLAN B. MERRILL.